United States Patent
Pereira et al.

(10) Patent No.: US 10,159,927 B2
(45) Date of Patent: Dec. 25, 2018

(54) HIGH PURITY GAS PURIFIER

(71) Applicant: Entegris, Inc., Billerica, MA (US)

(72) Inventors: Stenio da Costa Pereira, San Diego, CA (US); Peter K. Shogren, Chula Vista, CA (US); Rocky D. Gipson, San Marcos, CA (US)

(73) Assignee: Entegris, Inc., Billerica, MA (US)

( * ) Notice: Subject to any disclaimer, the term of this patent is extended or adjusted under 35 U.S.C. 154(b) by 57 days.

(21) Appl. No.: 15/303,831

(22) PCT Filed: Apr. 17, 2015

(86) PCT No.: PCT/US2015/026459
§ 371 (c)(1),
(2) Date: Oct. 13, 2016

(87) PCT Pub. No.: WO2015/161245
PCT Pub. Date: Oct. 22, 2015

(65) Prior Publication Data
US 2017/0036158 A1 Feb. 9, 2017

Related U.S. Application Data

(60) Provisional application No. 61/981,390, filed on Apr. 18, 2014.

(51) Int. Cl.
*B01D 53/04* (2006.01)
*B01D 53/26* (2006.01)

(52) U.S. Cl.
CPC ..... *B01D 53/0415* (2013.01); *B01D 53/0423* (2013.01); *B01D 53/0446* (2013.01);
(Continued)

(58) Field of Classification Search
CPC ............ B01D 53/0415; B01D 53/0423; B01D 53/0446; B01D 53/261; B01D 2253/102;
(Continued)

(56) References Cited

U.S. PATENT DOCUMENTS 3,840,119 A * 10/1974 Weirich ................. B01D 29/44
210/90
5,114,447 A 5/1992 Davis
(Continued)

FOREIGN PATENT DOCUMENTS

DE 201 16 232 U1 1/2002
DE 103 13 575 A1 9/2004
(Continued)

OTHER PUBLICATIONS

Notification of Transmittal of the International Search Report and the Written Opinion of the International Searching Authority, or the Declaration from International Application No. PCT/US2015/026459; dated Jul. 8, 2015; Entitled: "High Purity Gas Purifier".
(Continued)

*Primary Examiner* — Frank Lawrence
(74) *Attorney, Agent, or Firm* — Entergris, Inc.

(57) ABSTRACT

High-purity gas purifiers for purification of corrosive gases, such as halogen gases or halide gases, and noncorrosive gases, such as hydrogen and inert gases, methods of making and methods of using the gas purifiers, are described. The gas purifier includes a housing made of nickel or stainless steel. Within the housing, the gas purifier includes a purifier resin, including a modifier coated onto a substrate. The gas purifier further includes porous nickel membranes located at the inlets and outlets of the device. The inlets and outlets are capable of fluid communication with external fixtures.

22 Claims, 4 Drawing Sheets

(52) U.S. Cl.
CPC ...... *B01D 53/261* (2013.01); *B01D 2253/102* (2013.01); *B01D 2253/104* (2013.01); *B01D 2253/108* (2013.01); *B01D 2253/25* (2013.01); *B01D 2256/26* (2013.01); *B01D 2258/0216* (2013.01)

(58) Field of Classification Search
CPC ........ B01D 2253/104; B01D 2253/108; B01D 2253/25; B01D 2256/26; B01D 2258/0216
USPC .............. 95/90, 131; 96/121, 131, 132, 154; 423/240 S
See application file for complete search history.

(56) References Cited

U.S. PATENT DOCUMENTS

| | | |
|---|---|---|
| 5,487,771 A | 1/1996 | Zeller |
| 5,545,242 A * | 8/1996 | Whitlock ........... B01D 46/0012 |
| | | 210/435 |
| 5,667,566 A | 9/1997 | Flynn et al. |
| 6,350,300 B1 * | 2/2002 | Spiegelman ....... B01D 53/0415 |
| | | 55/418 |
| 7,534,287 B2 | 5/2009 | Zeller et al. |
| 8,932,381 B2 | 1/2015 | Zeller |
| 2002/0134247 A1 * | 9/2002 | Spiegelnnan ...... B01D 53/0431 |
| | | 96/135 |
| 2013/0305673 A1 | 11/2013 | Zeller |

FOREIGN PATENT DOCUMENTS

| | | |
|---|---|---|
| EP | 1 048 541 A1 | 11/2000 |
| WO | WO 2013/119883 A1 | 8/2013 |
| WO | WO 2014/190264 A1 | 11/2014 |
| WO | WO 2015/161245 A1 | 10/2015 |

OTHER PUBLICATIONS

Written Opinion of the International Preliminary Examining Authority from International Application No. PCT/US2015/026459; dated Mar. 21, 2016; Entitled: "High Purity Gas Purifier".

Notification of Transmittal of the International Preliminary Report on Patentability from International Application No. PCT/US2015/026459; dated Jul. 20, 2016; Entitled: "High Purity Gas Purifier".

* cited by examiner

HIGH PURITY GAS PURIFIER

RELATED APPLICATION

This application is the U.S. National Stage of International Application No. PCT/US2015/026459, filed on Apr. 17, 2015, published in English, which claims the benefit of U.S. Provisional Application No. 61/981,390, filed on Apr. 18, 2014, the entire teachings of which applications are incorporated herein by reference.

TECHNICAL FIELD TO WHICH THE INVENTION RELATES

The invention generally is directed to a gas purifier for removing molecular contaminants, moisture, particulates, volatile metals and hydrocarbons that may be present in corrosive gases, such as halogen or halide gases, and non-corrosive gases, such as hydrogen. In one embodiment, a gas purifier includes a nickel housing, a nickel inlet end cap and a nickel outlet end cap, the end caps each having a fluid fitting external to the housing with a sealing surface for sealingly coupling to external fixtures, a purifier resin centrally disposed within the nickel housing, and inlet and outlet porous nickel membranes situated between the end caps and the purifier resin.

PRIOR ART

Background of the Invention

Semiconductor manufacturing operations require that wafer surfaces be as clean as possible. High purity hydrogen halide gases, liquid hydrogen halides, and other corrosive gases are utilized in the semiconductor industry in manufacturing processes like cleaning reactor tubes and cleaning susceptors. Hydrogen halide gases and other corrosive gases can also be used as an etchant in the manufacture of microcircuits.

The methods taught in the prior art, do not necessarily meet the purity requirements of today's customers in the semiconductor industry. There is a continuing need for the preparation of ultra-high purity halogen and halide gases, including hydrogen halides, nonmetal halides, and organo-halides, to meet the new purification demands of the semiconductor industry. Additionally, there is a need for preparation of ultra-high purity noncorrosive gases, such as hydrogen and inert gases.

TECHNICAL CONTENT OF THE INVENTION

Summary of the Invention

This invention pertains to gas purifiers, as well as methods of making and using gas purifiers, for removing molecular contaminants, moisture, particulates, volatile metals and hydrocarbons that may be present in halogen or halide gases. This invention further pertains to the purification of molecular contaminants, moisture, and particulates that may be present in hydrogen and inert gases.

In accordance with a version of the invention, there is provided a gas purifier comprising a nickel housing, a nickel inlet end cap and a nickel outlet end cap, the end caps each having a fluid fitting external to the housing with a sealing surface for sealingly coupling to external fixtures, a purifier resin centrally disposed within the nickel housing, and inlet and outlet porous nickel membranes situated between the end caps and the purifier resin.

In further, related versions, the purifier resin may be a coating material coated onto a porous carbon support or onto a porous alumina support. The coating material may be a magnesium halide or a fluoride salt. The concentration of coating material may be about 5 to 75%, 10-40% or 15% to 30% by weight. The housing, end caps, and fluid fittings may have a surface finish of less than about 15 micro Ra on fluid-facing surfaces. The fluid fittings may be formed of stainless steel welded to the nickel end caps. The gas purifier may further comprise a media separator situated within the housing between the inlet and outlet porous nickel membranes to separate two beds of purifier resin.

In other related versions, there is provided a gas purifier comprising a base having an inlet port and an outlet port and optionally configured to be removably fixed to a surface of an external fixture. The gas purifier further comprises an elongated outer shell connected to the base on a first end and enclosed on a second end, and an elongated inner nickel shell, disposed within the outer shell with a gap therebetween, a first end of the inner shell in fluid communication with the inlet port, a second end of the inner shell in fluid communication with the gap, and the gap in fluid communication with the outlet port. The gas purifier further comprises inlet and outlet porous nickel membranes situated within the inner shell, the inlet membrane located near the first end of the inner shell and the outlet membrane located near the second end of the inner shell, and a purifier resin disposed between the inlet and outlet porous nickel membranes.

In further, related versions, the outer shell may be stainless steel or nickel. The resin may be a Group I or II halide salt coated onto a porous carbon support. The gas purifier may further comprise a media separator situated within the housing between the inlet and outlet porous nickel membranes to separate two beds of purifier resin. The inner shell, outer shell, and inlet and outlet ports may have a surface finish of less than about 15 micro Ra on fluid-facing surfaces.

In other related versions, there is provided a method of purifying a gas, comprising providing a gas purifier, introducing a gas containing contaminants into the gas purifier, the gas travelling through a flowpath of the gas purifier from an inlet port or end cap, through an inlet porous nickel membrane, a purifier resin, and a outlet porous nickel membrane, to an outlet port or end cap, the contaminants remaining within the membranes and purifier resin, and recovering the gas, purified from contaminants, from the outlet port or end cap. The gas may be a corrosive gas such as a hydrogen halide gas or a halogen gas. The purifier resin may be magnesium halide coated onto a porous carbon support. In other versions the gas may be a noncorrosive gas, such as hydrogen and inert gases.

In further, related versions, there is provided a method of making a gas purifier, comprising exposing porous material with a solution containing a coating substance, heating the porous material and the coating substance to create a purifier resin, and placing the purifier resin into a gas purifier. The method further comprises conditioning the purifier resin by providing a flow of purified gas to the inlet port or end cap, the purified gas moving through the purifier resin and out the outlet port or end cap, and purging the purifier resin by providing a flow of inert gas to the inlet port or end cap, the inert gas moving through the purifier resin and out the outlet port or end cap.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

BRIEF DESCRIPTION OF THE REFERENCE NUMERALS IN THE DRAWINGS

Figure 1A:
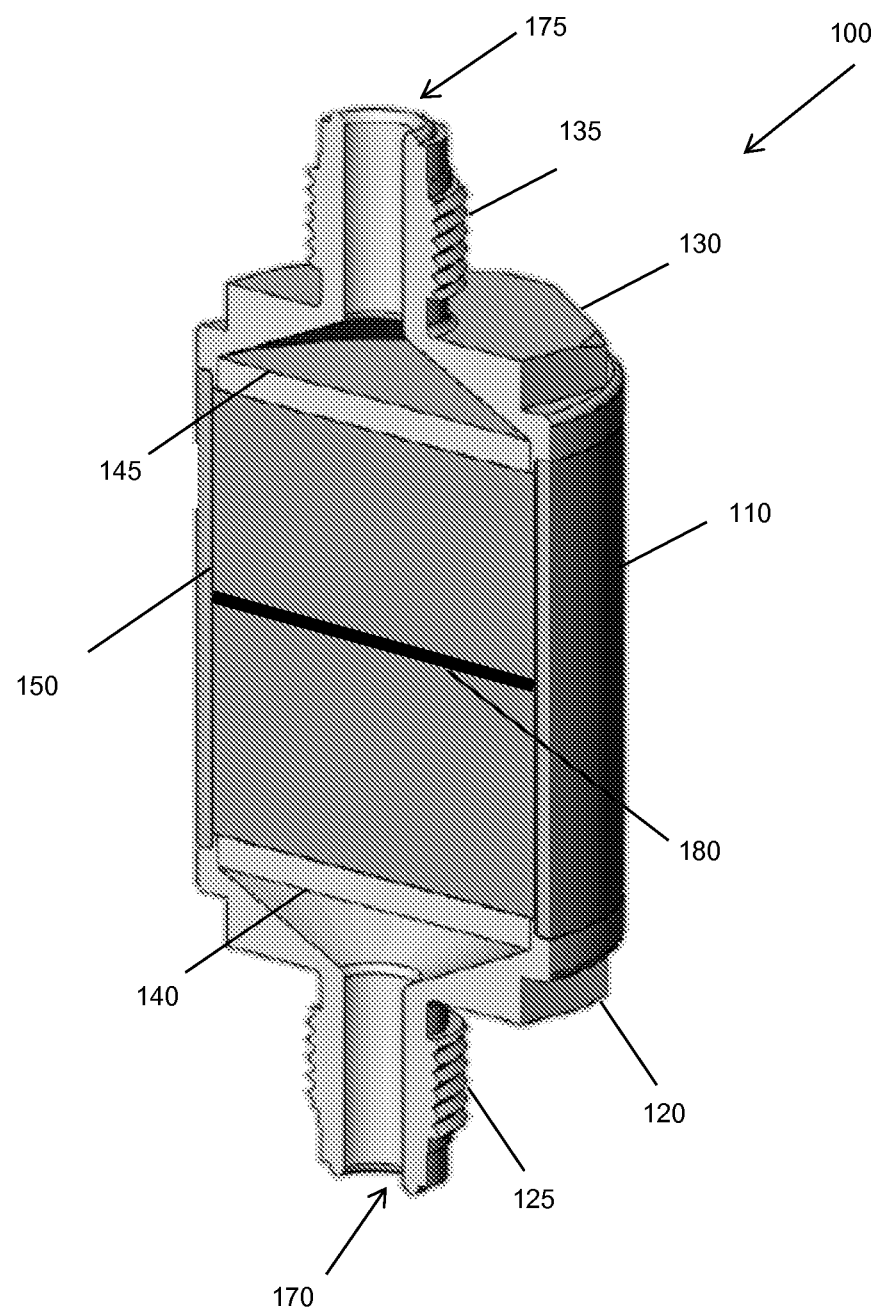
FIG. 1A is a section view of a gas purifier in accordance with one version of the invention.
Figure 1B:
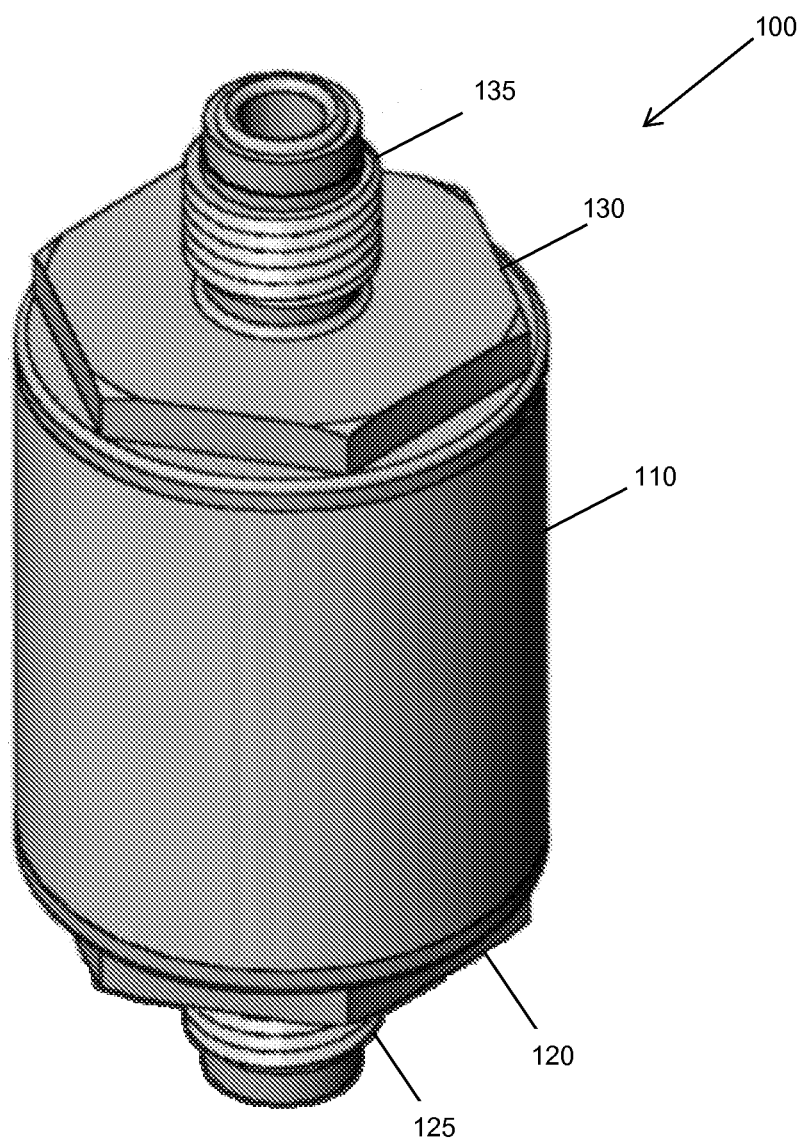
FIG. 1B is a perspective view of a gas purifier in accordance with one version of the invention.
Figure 2A:
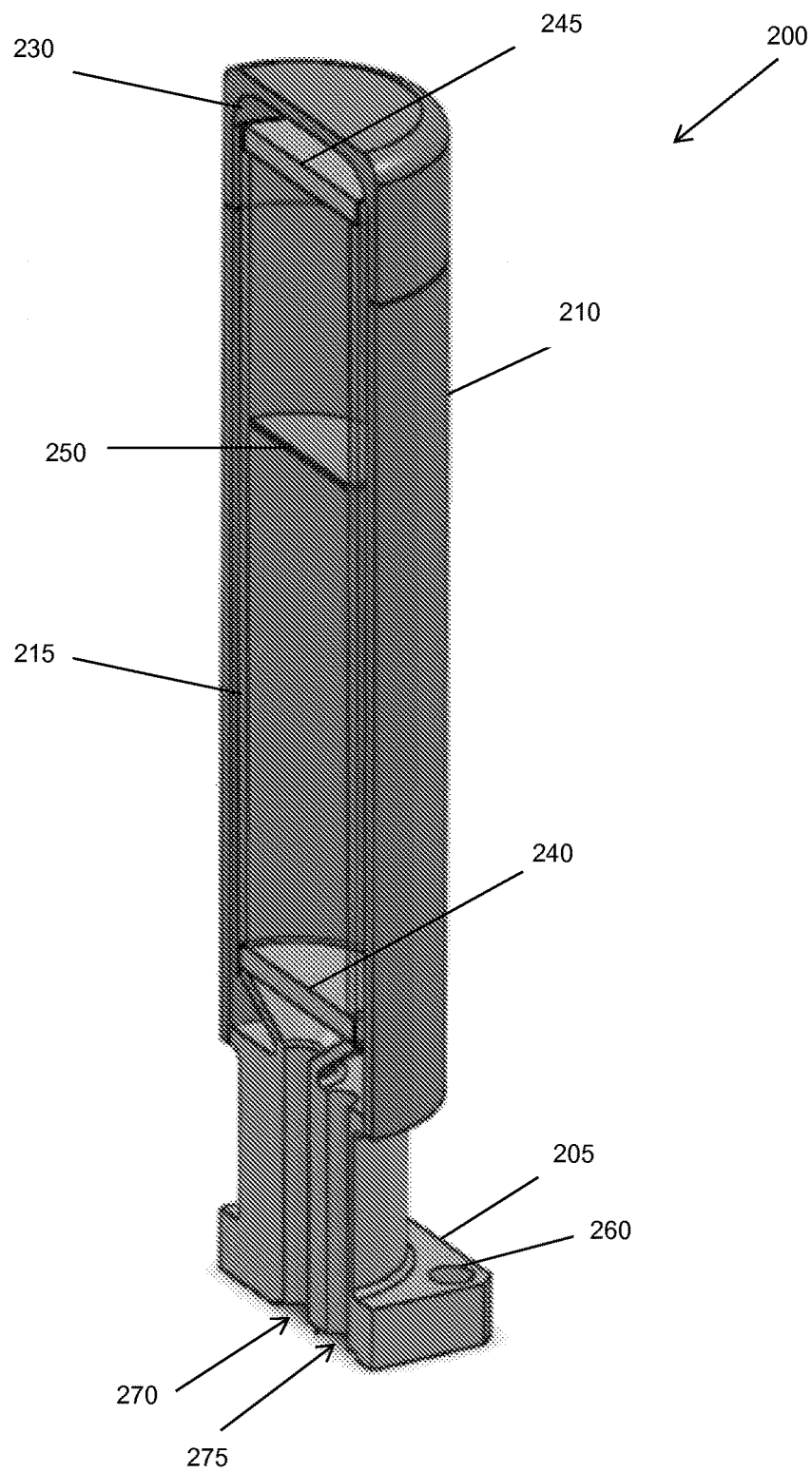
FIG. 2A is a section view of a gas purifier in accordance with one version of the invention.
Figure 2B:
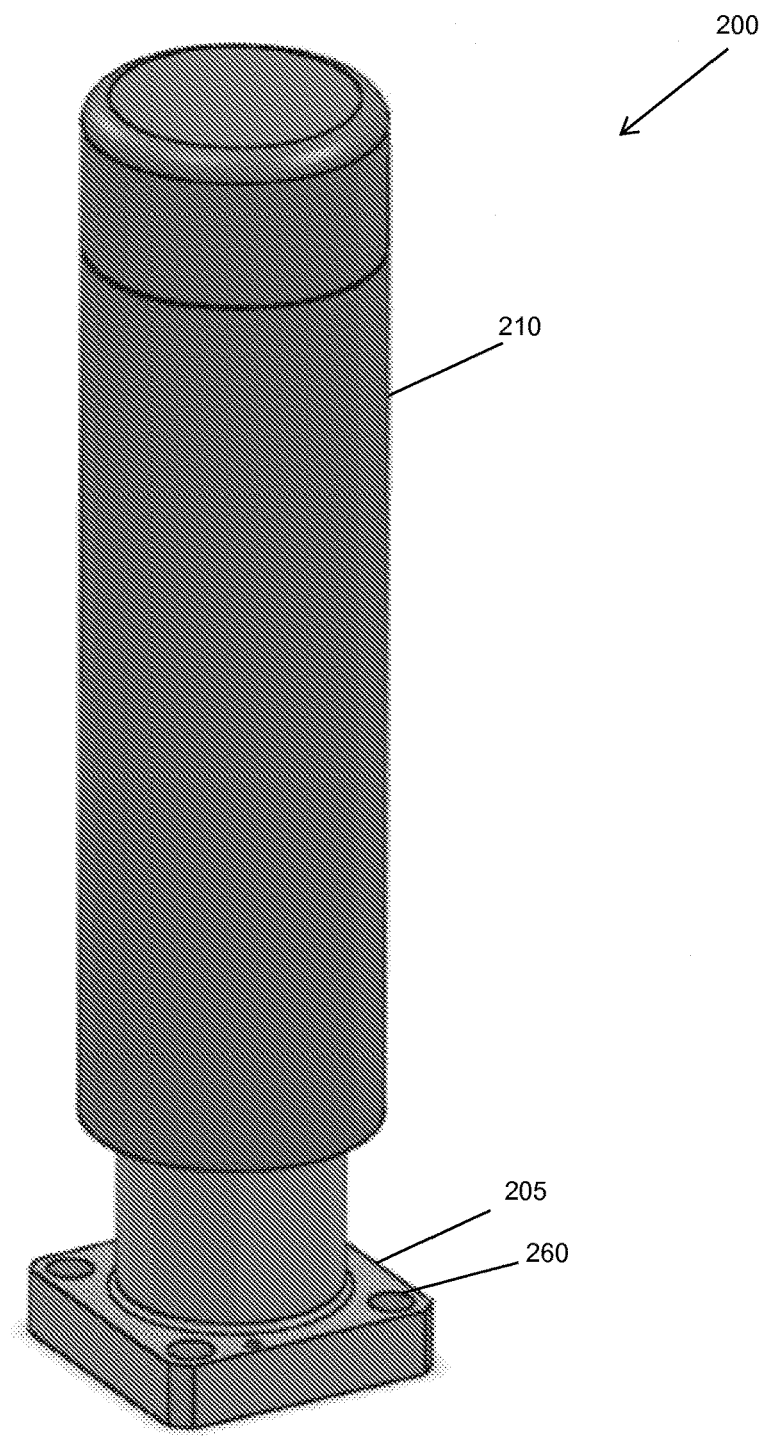
FIG. 2B is a perspective view of a gas purifier in accordance with one version of the invention.

Reference Numerals in FIG. 1A
100 gas purifier
110 nickel housing
120 nickel inlet end cap
125 inlet fluid fitting
130 nickel outlet end cap
135 outlet fluid fitting
140 inlet porous nickel metal membrane
145 outlet porous nickel metal membrane
150 media chamber
170 inlet port
175 outlet port
180 media separator
Reference Numerals in FIG. 1B
100 gas purifier
110 nickel housing
120 nickel inlet end cap
125 inlet fluid fitting
130 nickel outlet end cap
135 outlet fluid fitting
Reference Numerals in FIG. 2A
200 gas purifier
205 base
210 outer shell
215 inner shell
230 gap
240 inlet porous nickel membrane
245 outlet porous nickel membrane
250 media separator
260 bolt holes
270 inlet port
275 outlet port
Reference Numerals in FIG. 2B
200 gas purifier
205 base
210 outer shell
260 bolt holes

PRACTICE MODE

Detailed Description of the Invention

While this invention will be particularly shown and described with references to example embodiments thereof, it will be understood by those skilled in the art that various changes in form and details may be made therein without departing from the scope of the invention encompassed by the appended claims.

While various compositions and methods are described, it is to be understood that this invention is not limited to the particular molecules, compositions, designs, methodologies or protocols described, as these may vary. It is also to be understood that the terminology used in the description is for the purpose of describing the particular versions or versions only, and is not intended to limit the scope of the present invention which will be limited only by the appended claims.

It must also be noted that as used herein and in the appended claims, the singular forms "a", "an", and "the" include plural reference unless the context clearly dictates otherwise. Thus, for example, reference to a "nickel housing" is a reference to one or more nickel housing elements and equivalents thereof known to those skilled in the art, and so forth. Unless defined otherwise, all technical and scientific terms used herein have the same meanings as commonly understood by one of ordinary skill in the art. Methods and materials similar or equivalent to those described herein can be used in the practice or testing of versions of the present invention. All publications mentioned herein are incorporated by reference in their entirety. Nothing herein is to be construed as an admission that the invention is not entitled to antedate such disclosure by virtue of prior invention. "Optional" or "optionally" means that the subsequently described event or circumstance may or may not occur, and that the description includes instances where the event occurs and instances where it does not. All numeric values herein can be modified by the term "about" whether or not explicitly indicated. The term "about" generally refers to a range of numbers that one of skill in the art would consider equivalent to the recited value (i.e., having the same function or result). In some versions the term "about" refers to ±10% of the stated value, in other versions the term "about" refers to ±2% of the stated value. While compositions and methods are described in terms of "comprising" various components or steps (interpreted as meaning "including, but not limited to"), the compositions and methods can also "consist essentially of" or "consist of" the various components and steps, such terminology should be interpreted as defining essentially closed-member groups.

A description of example embodiments of the invention follows.

FIGS. 1A and 1B are section and perspective views, respectively, of a gas purifier in accordance with one version of the invention. The gas purifier 100 includes an all nickel housing 110. A nickel inlet end cap 120 has an inlet fluid fitting 125 and a nickel outlet end cap 130 has an outlet fluid fitting 135. Alternatively, the gas purifier 100 can include an all stainless-steel housing and stainless-steel end caps. The fluid fittings 125, 135 are shown in FIGS. 1A and 1B as male fittings but can also be configured to be female fittings or another configuration. The inlet fluid fitting 125 provides an inlet port 170 and the outlet fluid fitting provides an outlet port 175. The purifier 100 further includes an inlet porous nickel metal membrane 140 or screen and an outlet porous nickel metal membrane 145 or screen. A media chamber 150 containing purifier resin (not shown) is positioned between the inlet porous nickel metal membrane 140 or screen and the outlet porous nickel metal membrane 145 or screen. One or more beds of purifier resin may be included within the media chamber 150. A first bed of purifier resin may be separated from a second bed of purifier resin by an optional media separator 180.

The gas purifier 100 can be positioned in-line with other components of a gas purification process or semiconductor manufacturing process. The fluid fittings 125, 135 can have a gland sealing surface providing a fluid tight connection to other components connected to the gas purifier 100. Furthermore, the fluid fittings 125, 135 may be formed from nickel or may be formed from stainless steel welded to the nickel end caps 120, 130.

The gas purifier 100 can be made by welding the nickel inlet end cap 120 and inlet porous nickel metal membrane 140 to a first portion of the nickel housing 110. Purifier material or precursor material can be placed in the nickel housing 110 over the top of the inlet porous nickel metal membrane 140. A nickel outlet end cap 130 and outlet porous nickel metal membrane 145 or screen can be welded to a second portion of the nickel shell 110 to seal the purifier material (not shown) in the media chamber 150 in the nickel housing.

FIGS. 2A and 2B are section and perspective views, respectively, of a gas purifier in accordance with one version of the invention. The gas purifier 200 includes a base 205 having an inlet port 270 and an outlet port 275. The base can be configured to be removably fixed to a surface of an external fixture, such as a gas manifold, a gas supply source, or a processing chamber. The base 205 includes bolt holes 260. Bolt holes 260 are optional and can be used to removably attach the gas purifier to an external fixture. The bolt holes can be made to comply with various specifications, including SEMI F86-0304. The base can include c-seals for fluid tight connection to other components. The base can be made of stainless steel, including 316L stainless steel.

The gas purifier 200 further includes an elongated outer shell 210 connected to the base 205 on a first end and enclosed on a second end. An elongated inner shell 215 is disposed within the outer shell and a gap 230 is provided between the inner shell 215 and the interior surface of the outer shell 210. The inner shell 215 is in fluid communication with the inlet port 270 on a first end and is in fluid communication with the gap 230 on a second end. The gap 230 is in fluid communication with the outlet port 275. The gas purifier 200 further includes an inlet porous nickel membrane 240 and an outlet porous nickel membrane 245. Within the inner shell 215 and between the membranes 240, 245 is a media separator 250.

The outer shell 210 and inner shell 215 can be formed of nickel, such as Nickel 200, a commercial grade of nickel. Alternatively, the outer shell 210 can be formed of stainless steel, such as 316L stainless steel. To reduce corrosion of the gas purifier, surfaces of the gas purifier in contact with a gas contaminated with water vapor can be made of nickel.

The inlet porous nickel membranes 140, 240 and outlet porous nickel membranes 145, 245 can be high-porosity membranes or screens. For example, metal membrane elements are described in U.S. Pat. No. 5,114,447, filed on Mar. 12, 1991; U.S. Pat. No. 5,487,771, filed on Jul. 27, 1994; U.S. Pat. No. 7,534,287, filed on Dec. 10, 2007; U.S. Pat. No. 8,932,381, filed on Jun. 16, 2010; and U.S. patent application Ser. No. 13/982,936, filed on Jan. 24, 2012; the teachings of which are incorporated by reference.

The media separators 180, 250 can be a media-retaining porous membrane separating a first bed of purifier resin (not shown) from a second bed of purifier resin (not shown). Where one separator is shown in FIGS. 1A and 2A, more than one separator may be used. For example, media separators are described in International Application No. PCT/US2013/025239, filed on Feb. 8, 2013 and International Application No. PCT/US2014/039351, filed on May 23, 2014, the teachings of which are incorporated by reference. The location of the media separator 250 can vary depending upon the ratio of media included in the inner shell 215.

The purifier media, or purifier resin, can be a combination of a modifier, such as Group I or II halide salt, coated onto a substrate, such as alumina or activated carbon. The selection of a purifier media is dependent upon the gas to be purified. For purification of corrosive gases, the purifier media preferably comprises a monolayer purifier bed. Two types of purifier media may be included in a gas purifier as two separate media beds, which can be separated by a media separator. For example, a first bed of purifier media tailored to remove volatile metals from a gas may be separated from a second bed of purifier media tailored to remove moisture from the gas. Alternatively, the purifier media can be a mixed bed of two or more different media. Purification media substrates include activated carbon, alumina, zirconia, titanium dioxide, zeolites and zirconia. One substrate or a combination of two or more substrates may be used to create a purifier media. In some cases, a purification media may include a substrate without a coating. A listing of halogen, halide, organohalide, and other haloganted process gases, such as halogenated silanes, with corresponding example purifier media, including coating/modifiers and substrates, is listed in Table 1.

TABLE 1

Gases and Corresponding Purifier Media

| Gas | Coating/Modifier | Substrate |
| --- | --- | --- |
| HF | CsF | Alumina |
| HF | CsF | Activated carbon |
| HF | $FeF_3$ | Alumina |
| HF | $FeF_3$ | Activated carbon |
| HF | $CuF_2$ | Alumina |
| HF | $CuF_2$ | Activated carbon |
| HCl | $MgCl_2$ | Alumina |
| HCl | $MgCl_2$ | Activated carbon |
| HBr | $MgBr_2$ | Activated carbon |
| $F_2$ | NaF | Alumina |
| $F_2$ | NaF | $TiO_2$ |
| $F_2$ | NaF | Zirconia |
| $F_2$ | KF | Alumina |
| $F_2$ | KF | $TiO_2$ |
| $F_2$ | KF | Zirconia |
| $F_2$ | None | Alumina |
| $Cl_2$ | $MgCl_2$ | Alumina |
| $Cl_2$ | $MgCl_2$ | Activated carbon |
| $Br_2$* | $MgBr_2$ | Alumina |
| $Br_2$* | $MgBr_2$ | Activated carbon |
| $Br_2$* | None | Alumina |
| $Br_2$* | None | Zeolites |
| $NF_3$ | None | Zeolites |
| $NF_3$ | None | Alumina |
| $GeF_4$ | CsF | Alumina |
| $GeF_4$ | CsF | Activated carbon |
| $GeF_4$ | $FeF_3$ | Alumina |
| $GeF_4$ | $FeF_3$ | Activated carbon |
| $GeF_4$ | $CuF_2$ | Alumina |
| $GeF_4$ | $CuF_2$ | Activated carbon |
| $SiH_2Cl_2$ | $MgCl_2$ | Alumina |
| $SiH_2Cl_2$ | $MgCl_2$ | Activated carbon |
| $SiCl_4$ | $MgCl_2$ | Alumina |
| $SiCl_4$ | $MgCl_2$ | Activated carbon |
| $SiF_4$ | CsF | Alumina |
| $SiF_4$ | CsF | Activated carbon |
| $SiF_4$ | $FeF_3$ | Alumina |
| $SiF_4$ | $FeF_3$ | Activated carbon |
| $SiF_4$ | $CuF_2$ | Alumina |
| $SiF_4$ | $CuF_2$ | Activated carbon |
| $SiHCl_3$ | $MgCl_2$ | Alumina |
| $SiHCl_3$ | $MgCl_2$ | Activated carbon |
| $CH_3F$ | CsF | Alumina |

TABLE 1-continued

Gases and Corresponding Purifier Media

| Gas | Coating/Modifier | Substrate |
|---|---|---|
| $CH_3F$ | CsF | Activated carbon |
| $CH_3F$ | $FeF_3$ | Alumina |
| $CH_3F$ | $FeF_3$ | Activated carbon |
| $CH_3F$ | $CuF_2$ | Alumina |
| $CH_3F$ | $CuF_2$ | Activated carbon |
| $CHF_3$ | CsF | Alumina |
| $CHF_3$ | CsF | Activated carbon |
| $CHF_3$ | $FeF_3$ | Alumina |
| $CHF_3$ | $FeF_3$ | Activated carbon |
| $CHF_3$ | $CuF_2$ | Alumina |
| $CHF_3$ | $CuF_2$ | Activated carbon |
| $CF_4$ | CsF | Alumina |
| $CF_4$ | CsF | Activated carbon |
| $CF_4$ | $FeF_3$ | Alumina |
| $CF_4$ | $FeF_3$ | Activated carbon |
| $CF_4$ | $CuF_2$ | Alumina |
| $CF_4$ | $CuF_2$ | Activated carbon |
| $C_3F_8$ | CsF | Alumina |
| $C_3F_8$ | CsF | Activated carbon |
| $C_3F_8$ | $FeF_3$ | Alumina |
| $C_3F_8$ | $FeF_3$ | Activated carbon |
| $C_3F_8$ | $CuF_2$ | Alumina |
| $C_3F_8$ | $CuF_2$ | Activated carbon |
| $C_4H_9F$ | CsF | Alumina |
| $C_4H_9F$ | CsF | Activated carbon |
| $C_4H_9F$ | $FeF_3$ | Alumina |
| $C_4H_9F$ | $FeF_3$ | Activated carbon |
| $C_4H_9F$ | $CuF_2$ | Alumina |
| $C_4H_9F$ | $CuF_2$ | Activated carbon |
| $C_2F_6$ | CsF | Alumina |
| $C_2F_6$ | CsF | Activated carbon |
| $C_2F_6$ | $FeF_3$ | Alumina |
| $C_2F_6$ | $FeF_3$ | Activated carbon |
| $C_2F_6$ | $CuF_2$ | Alumina |
| $C_2F_6$ | $CuF_2$ | Activated carbon |
| $C_4F_6$ | CsF | Alumina |
| $C_4F_6$ | CsF | Activated carbon |
| $C_4F_6$ | $FeF_3$ | Alumina |
| $C_4F_6$ | $FeF_3$ | Activated carbon |
| $C_4F_6$ | $CuF_2$ | Alumina |
| $C_4F_6$ | $CuF_2$ | Activated carbon |

*Elemental bromine is a liquid. Bromine could be supplied as a gas mixture, for example, in helium, nitrogen or argon.

Gas purifier 100, 200 can also include one or more purifier resin beds for the purification of inert or non-corrosive gases and semi-gases. For example, hydrogen, argon, helium, and nitrogen could be purified utilizing media comprising zeolites (crystalline materials), activated carbon (amorphous materials), and catalytic materials (a combination of both crystalline and amorphous materials), either individually or in combination. For example, hydrogen and inert gases can be purified using media comprising zeolite, activated carbon and nickel catalyst.

The concentration of a modifier to substrate can range from 5% to 75% by weight, 10-40% by weight, or 15-30% by weight. For example, a magnesium halide salt in concentrations of equal to or greater than 15% but less than or equal to 20% by weight on a high surface area carbonaceous substrate is effective. For further example, a fluoride salt in concentrations of equal to or greater than 15% but less than or equal to 30% by weight on a high surface area carbonaceous or alumina substrate is effective.

The surface area of a substrate can be 200-1200 square meters/gram, 500-1000 square meters/gram, or about 1000 square meters/gram.

A method of purifying gas, for example hydrogen bromide (HBr) gas, can include the steps or acts of: (a) flowing a source of HBr gas containing contaminants, including water vapor, into the inlet of an HBr purifier, for example gas purifier 100 or 200 containing a purifier resin of a Group II bromide salt deposited on a high surface area carbonaceous support; (b) passing the HBr gas containing the contaminants through the purifier; and, (c) removing purified HBr gas from the outlet of the HBr purifier, the purified HBr gas contains less water vapor than the HBr gas inlet to the purifier.

Purified gas exiting the gas purifier having purifier material contained in a nickel housing will have a lower metals content compared to purified gas exiting a gas purifier having purifier material contained in a traditional steel housing. For example, the purified HBr gas exiting from the outlet of a gas purifier having purifier material contained in a nickel housing has a water vapor content of less than about 1 $ppm_{v/v}$ (parts per million). In some cases the water vapor content of the purified HBr can be less than 100 $ppb_{v/v}$ (parts per billion). The moisture content of the purified HBr gas can be determined using Fourier Transform Infrared (FTIR) spectroscopy or Cavity Ring Down Spectroscopy (CRDS).

HBr gas can be sampled before and after purification for a predetermined amount of time to measure metals content. A bubbler can be used to capture samples of HBr gas and analysis can be conducted by inductively coupled plasma mass spectrometry (ICP-MS). A variety of trace metals may be monitored in one scan. Low detection sensitivity can be achieved by pre-concentration of the sample, the use of background suppression and separation column, and completion of testing in a controlled cleanroom environment with chemical filters.

Current performance data for the purification of sample gases from water vapor utilizing media of $MgCl_2$ coated onto an activated carbon substrate is shown in Table 2.

TABLE 2

Water Vapor Purification Data

| Gas | Moisture Capacity | Outlet Purity |
|---|---|---|
| HCl | 25 L/L | 20 ppbv |
| $N_2$ | 18 L/L | 1 ppbv |

Current performance data for the purification of HBr gas for metals removal utilizing media of $MgBr_2$ coated onto activated carbon substrate is shown in Table 3.

TABLE 3

Metals Removal Purification Data

| Metal Contaminant | Removal Efficiency |
|---|---|
| Chromium | 98.6% |
| Iron | 99.7% |
| Manganese | 99.4% |
| Molybdenum | 77.9% |
| Nickel | 96.9% |

A method of making a body of gas purifier 100, for example an HBr gas purifier, in accordance with the present invention, includes the following steps or acts: (a) placing a magnesium-bromide-coated carbon material into a first purifier housing sub-assembly that includes a nickel shell, a porous nickel metal membrane, and a nickel end cap; and, (b) welding a second purifier housing sub-assembly that includes a nickel metal membrane and a nickel metal end cap to the nickel shell portion of the first nickel purifier housing sub-assembly, the magnesium bromide coated carbon material contained within the nickel shell. The purifier can have components including inlet and outlet fittings, inlet and outlet caps, a shell, and inlet and outlet porous membranes. The purifier components comprise 99% by weight or more of nickel metal and one or more components can be welded together.

A method of making a gas purifier media or resin, for example for an HBr gas purifier, in accordance with the present invention, includes the following steps or acts: (a) activating magnesium-bromide-coated carbon material in a nickel housing with heating in a flow of dry purified nitrogen gas and then cooling the inert gas activated magnesium-bromide-coated carbon material to room temperature; and (b) conditioning the activated magnesium-bromide-coated carbon material from step (a) in a purified hydrogen bromide gas composition. The conditioning of the activated magnesium-bromide-coated carbon material from step (a) can occur in a purified hydrogen bromide gas composition with heating.

An aqueous or methanolic solution of $MgBr_2$ can be allowed to contact the porous carbon support. After the carbon support material is coated, the coated material can be dried either in vacuo or by flowing dry $N_2$ at room temperature for about one hour and then with heating at 60-80° C. for another hour. After initial drying, the coated carbon material can be loaded into a purifier body and activated with heating. For example, heating can be at a temperature in the range of about 150° C. to about 300° C. for about 8 hours in a flow of dry, purified nitrogen gas and then the material can cooled to room temperature. The coated carbon material (the carbon support impregnated with $MgBr_2$ or solvates thereof) can then be conditioned in a purified and/or heated hydrogen bromide gas composition using a purified HBr gas stream (HBr gas with moisture removed using another HBr purifier available from Entegris, Inc.) at room temperature and/or with externally applied heat to the purifier by a Vent/Fill method. The temperature of the activated material during conditioning with HBr can be measured with a temperature probe contacting the outside of the housing. The conditioned purifier can subsequently be purged with an inert gas, with optional heating, to remove residual conditioning HBr to safe concentration levels.

The inlet fluid fittings and outlet fluid fittings can be machined to the nickel end caps or welded to the nickel end caps. The inlet fluid fitting sealing gland surface and the outlet fluid fitting sealing gland surface can have a surface finish of 15 micro inch Ra or less. In some cases, the surface of the inlet fluid fitting gland surface and the outlet fluid fitting gland surface can have a surface finish of 5 micro inch Ra or less. Fluid contacting surfaces of the purifier shell and end cap can also have a surface finish of 15 micro inch Ra or less. In some cases the fluid contacting surfaces of the purifier shell and end caps can have a surface finish of 5 micro inch Ra or less.

Nickel metal that can be used for the housing and membranes include those compositions that are 99% Ni by weight or more. An example of a nickel metal that can be used for the housing is Ni 200.

The porous nickel membrane outlet from the purifier can have a particle retention removal of all particles referenced at the most penetrating particle size of greater than or equal to 0.003 micron, of greater than 99.9999%.

A nickel screen or nickel porous membrane can have a mesh or pore size that is smaller than the size of the carbon based support resin material so that the purifier resin remains contained within the housing.

Although the invention has been shown and described with respect to one or more implementations, equivalent alterations and modifications will occur to others skilled in the art based upon a reading and understanding of this specification and the annexed drawings. The invention includes all such modifications and alterations and is limited only by the scope of the following claims. In addition, while a particular feature or aspect of the invention may have been disclosed with respect to only one of several implementations, such feature or aspect may be combined with one or more other features or aspects of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising." Also, the term "exemplary" is merely meant to mean an example, rather than the best. It is also to be appreciated that features and/or elements depicted herein are illustrated with particular dimensions and/or orientations relative to one another for purposes of simplicity and ease of understanding, and that the actual dimensions and/or orientations may differ substantially from that illustrated herein.

Although the present invention has been described in considerable detail with reference to certain versions thereof, other versions are possible. Therefore the spirit and scope of the appended claims should not be limited to the description and the versions contained within this specification.

The teachings of all patents, published applications and references cited herein are incorporated by reference in their entirety.

What is claimed is:

1. A gas purifier, comprising:
    a nickel housing;
    a nickel inlet end cap and a nickel outlet end cap, the inlet and outlet caps attached to opposing ends of the housing, the inlet and outlet end caps each having a fluid fitting external to the housing with a sealing surface for sealingly coupling to external fixtures;
    a purifier media centrally disposed within the nickel housing;
    an inlet porous nickel membrane situated between the inlet end cap and the purifier media; and
    an outlet porous nickel membrane situated between the outlet end cap and the purifier media.

2. The gas purifier of claim 1, wherein the purifier media is a coating material coated onto a porous carbon or alumina support.

3. The gas purifier of claim 2, wherein the coating material is a Group I or Group II halide salt.

4. The gas purifier of claim 2, wherein the coating material is a fluoride salt.

5. The gas purifier of claim 2, wherein the concentration of coating material is about 5% to 75% by weight.

6. The gas purifier of claim 2, wherein the concentration of coating material is about 10% to 40% by weight.

7. The gas purifier of claim 2, wherein the concentration of coating material is about 15% to 30% by weight.

8. The gas purifier of claim 1, wherein the housing, the end caps, and the fluid fittings have a surface finish of less than about 15 micro Ra on fluid-facing surfaces.

9. The gas purifier of claim 1, wherein the fluid fittings are formed from stainless steel welded to the end caps.

10. The gas purifier of claim 1, wherein the purifier media includes first and second beds of purifier media, and further comprising a media separator situated within the housing between the inlet and outlet porous nickel membranes, the media separator separating the first bed of purifier media from the second bed of purifier media.

11. A gas purifier, comprising:
a base having an inlet port and an outlet port and optionally configured to be removably fixed to a surface of an external fixture;
an elongated outer shell connected to the base on a first end and enclosed on a second end;
an elongated inner nickel shell, disposed within the outer shell with a gap therebetween, a first end of the inner shell in fluid communication with the inlet port, a second end of the inner shell in fluid communication with the gap, the gap in fluid communication with the outlet port;
an inlet porous nickel membrane situated within the inner shell and located near the first end of the inner shell;
an outlet porous nickel membrane situated within the inner shell and located near the second end of the inner shell; and
a purifier media disposed between the inlet and outlet porous nickel membranes.

12. The gas purifier of claim 11, wherein the outer shell is stainless steel.

13. The gas purifier of claim 11, wherein the outer shell is nickel.

14. The gas purifier of claim 11, wherein the purifier media is a Group I or Group II halide salt coated onto a porous carbon or alumina support.

15. The gas purifier of claim 11, wherein the purifier media is a fluoride salt coated onto a porous carbon or alumina support.

16. The gas purifier of claim 11, wherein the purifier media includes first and second beds of purifier media, and further comprising a media separator situated within the inner shell between the inlet and outlet porous nickel membranes, the media separator separating the first bed of purifier media from the second bed of purifier media.

17. The gas purifier of claim 11, wherein the inner shell, the outer shell, and the inlet and outlet ports have a surface finish of less than about 15 micro Ra on fluid-facing surfaces.

18. A method of purifying a gas, comprising:
providing a gas purifier of claim 1;
introducing a gas containing contaminants into the gas purifier, the gas travelling through a flowpath from the inlet port/end cap, through the inlet porous nickel membrane, the purifier media, and the outlet porous nickel membrane, to the outlet port/end cap, the contaminants remaining within the membranes and purifier media; and
recovering the gas, purified from contaminants, from the outlet port/end cap.

19. The method of claim 18, wherein the gas is a halide gas, hydrogen halide, silicon halide, nitrogen halide or organohalide.

20. The method of claim 18, wherein the purifier media is magnesium halide salt coated onto a porous carbon or alumina support.

21. The method of claim 18 where the purifier media is a fluoride salt coated onto a porous carbon or alumina support.

22. A method of making a gas purifier, comprising:
exposing porous material with a solution containing a coating substance;
heating the porous material and the coating substance to create a purifier media;
placing the purifier media into a nickel housing or a nickel shell of a purifier body, the purifier media disposed between an inlet porous nickel membrane and an outlet porous nickel membrane, forming the gas purifier of claim 1;
conditioning the purifier media by providing a flow of purified gas to the inlet port/end cap, the purified gas moving through the purifier media and out the outlet port/end cap; and
purging the purifier media by providing a flow of inert gas to the inlet port/end cap, the inert gas moving through the purifier media and out the outlet port/end cap.

* * * * *